United States Patent [19]

Cage et al.

[11] Patent Number: 5,297,065
[45] Date of Patent: Mar. 22, 1994

[54] MAGNETIC TRANSIENT DETECTION AND CALIBRATION TECHNIQUE FOR AN AUTO-CALIBRATING COMPASS

[75] Inventors: Russell E. Cage, Ann Arbor, Mich.; John A. Wilke, Eppstein-Bremthal, Fed. Rep. of Germany; Rafi A. Al-Attar, Troy, Mich.

[73] Assignee: Chrysler Corporation, Highland Park, Mich.

[21] Appl. No.: 815,268

[22] Filed: Dec. 27, 1991

[51] Int. Cl.$^5$ .................. G01C 25/00; G01D 18/00
[52] U.S. Cl. .................. 364/571.05; 364/571.02; 364/571.01; 364/559; 73/1 E; 33/356
[58] Field of Search .............. 365/559, 571.01–571.08; 33/355 R, 356, 357; 73/1 E

[56] References Cited

U.S. PATENT DOCUMENTS

| | | |
|---|---|---|
| 3,899,834 | 8/1975 | Harrison, Jr. . |
| 3,991,361 | 11/1976 | Mattern et al. . |
| 4,414,753 | 11/1983 | Moulin et al. .................. 33/356 |
| 4,416,067 | 11/1983 | Scherer et al. .................. 364/571.04 |
| 4,424,631 | 1/1984 | Franks .................. 33/355 R |
| 4,425,717 | 1/1984 | Marcus . |
| 4,497,034 | 1/1985 | Kuno et al. .................. 364/559 |
| 4,505,054 | 3/1985 | Clark et al. . |
| 4,546,550 | 10/1985 | Marchent et al. .................. 33/356 |
| 4,546,551 | 10/1985 | Franks . |
| 4,622,646 | 11/1986 | Waller et al. . |
| 4,677,381 | 6/1987 | Geerlings . |
| 4,698,912 | 10/1987 | Fowler et al. . |
| 4,750,349 | 6/1988 | Luitje .................. 364/559 |
| 4,797,841 | 1/1989 | Hatch .................. 364/571.04 |
| 4,870,602 | 9/1989 | Bäumker .................. 364/571.02 |
| 5,131,154 | 7/1992 | Schierbeek et al. .................. 33/356 |
| 5,131,155 | 7/1992 | Takano et al. .................. 33/356 |

FOREIGN PATENT DOCUMENTS

| | | |
|---|---|---|
| 0120691 | 10/1984 | European Pat. Off. . |
| 60-135814 | 7/1985 | Japan . |
| 2056686 | 3/1981 | United Kingdom . |

*Primary Examiner*—Jack B. Harvey
*Assistant Examiner*—Jae H. Choi
*Attorney, Agent, or Firm*—Mark P. Calcaterra

[57] ABSTRACT

A magnetic transient detection technique which alerts a microcomputer of an auto-calibrating compass when electrical transients which produce magnetic transients have occurred. The technique employs an electronic compass control circuit having a sampling rate high enough to isolate electrical transients from transients produced by normal motion of the vehicle. Accelerations in data values defined as the difference between two changes in the coordinates for the center of the earth's magnetic field circle, are calculated and compared to predetermined threshold accelerations. Previous acceleration values and their associated vehicle magnetic field vectors can be stored in the microcomputer. After a magnetic transient is detected, its associated vehicle magnetic field vector is subtracted from the resultant magnetic field to yield vehicle heading. Once detected, magnetic transients are also used to initiate auto-calibration.

5 Claims, 3 Drawing Sheets ical transients. A problem exists when the vehicle's magnetic field changes suddenly, as can happen when small electric motors in the vicinity of the flux-gate sensor turn on or off. It is desirable that the auto-calibration method incorporate magnetic transients in the calculation of the calibration offset for the vehicle's magnetic field.

MAGNETIC TRANSIENT DETECTION AND CALIBRATION TECHNIQUE FOR AN AUTO-CALIBRATING COMPASS

Cross-Reference to Related Applications

The present application is related to the following, co-pending applications filed concurrently herewith:

"Scaling System And Method For An Electronic Compass", application Ser. No. 07/815,347, presently pending;

"Shifting System And Method For An Electronic Compass System", application Ser. No. 07/815,267, presenting pending;

"Data Processing Method For An Electronic Compass System", application Ser. No. 07/815,266, presently pending;

"Heading Computation For An Electronic Compass", application Ser. No. 07/815,346, presently pending;

"Method For Selecting Calibration Data For An Auto-Calibrating Compass", application Ser. No. 07/815,264, presently pending;

"Flux-Gate Sensor Orientation Method", application Ser. No. 07/815,265, presently pending;

"Noise Removal Method For An Electronic Compass", application Ser. No. 07/815,269, presenting pending;

"Flux-Gate Sensor Mounting And Method", application Serial No. 07/815,270, presently pending;

"A Method For Interpreting Magnetic Direction For A Compass On A "Vehicle", application Ser. No. 07/815,274, presently pending.

The disclosures of all the applications cited above are hereby incorporated by reference and made a part hereof the same as if fully set forth herein.

BACKGROUND OF THE INVENTION

Technical Field

The present invention relates to electronic compasses and more specifically to a magnetic transient detection and calibration technique for an auto-calibrating compass.

Discussion

Normally, electronic compass systems employ a microcomputer to calculate vehicle headings based upon signals received from a magnetic flux-gate sensor. An example of a microcomputer-based electronic compass can be found in U.S. Pat. No. 4,622,843 to Hormel, issued Nov. 18, 1986, entitled "Simplified Calibration Technique and Auto-Ranging Circuit for an Electronic Compass Control Circuit".

The operation of flux-gate sensors are also well-documented. See, for example, "Magnetic Field Sensor and its Application to Automobiles", by Hisatsugu Itch, dated February, 1980 and published by the Society of Automotive Engineers as Paper No. 800123; "Magnetic Heading Reference for the Electro/Fluidic Autopilot", by Doug Garner which appeared in two parts, one in the November, 1981 and one in the December, 1981 issues of *Sport Aviation*.

The subject invention is closely related to the method described in commonly assigned U.S. Pat. No. 4,807,462 to Al-Attar issued Feb. 28, 1989 entitled, "Method for Performing Automatic Calibration in an Electronic Compass." This document is hereby incorporated by reference.

During the auto-calibration process, the microcomputer of the electronic compass system calculates a magnetic offset constant to subtract the effects of the vehicle's magnetic field from the readings of the flux-gate sensor. The set of all possible vehicle directions is represented by a roughly circular locus of points around this calibration offset. The plotted points are the filtered readings of the two sensor coils of the flux-gate sensor.

Auto-calibrating compasses suffer from real world problems. As discussed in the '462 patent to Al-Attar, auto-calibration occurs as a vehicle equipped with an auto-calibrating compass is driven. Since the calibration process is continuous, it is subject to the effects of minor variations in the vehicle's magnetic field caused by magnetic transients. A problem exists when the vehicle's magnetic field changes suddenly, as can happen when small electric motors in the vicinity of the flux-gate sensor turn on or off. It is desirable that the auto-calibration method incorporate magnetic transients in the calculation of the calibration offset for the vehicle's magnetic field.

A method for calculating the vector for the noise caused by magnetic anomalies and transients is disclosed in German Pat. No. DE 364468 1A1 issued Jul. 14, 1988 to Helldorfer. A microcomputer is used to calculate the difference between a magnetic field vector sensed by compass sensor and a previous magnetic field vector for the same heading. The resultant vector is then weighted by a factor k less than 1 which effectively suppresses the effect of the anomalies and transients upon the direction of the vehicle.

SUMMARY OF THE INVENTION

In accordance with the teachings of the present invention, a magnetic transient detection and calibration technique for an auto-calibrating compass is provided. The magnetic transient detection technique alerts the microcomputer of the auto-calibrating compass when the flux-gate sensor is influenced by a magnetic field caused by electrical equipment in the vehicle being switched on or off. The technique employs an electronic compass control circuit having a sampling rate high enough to isolate electronic transients from transients produced by normal motion of the vehicle and a microcomputer having sufficient memory and processing power to recognize the pattern of the switching transient even if it is buried in noise. The microcomputer calculates accelerations in data values for a given heading, where acceleration is defined by the difference between two changes in the coordinates for the center of the earth's magnetic field circle. The accelerations are then compared with threshold accelerations representing the minimum acceleration caused by switching electrical equipment on or off.

This technique is useful in calculating heading. Previous acceleration values and their associated vehicle magnetic field vectors can be stored in the microcomputer. After a magnetic transient is detected, its associated vehicle magnetic field vector is subtracted from a resultant magnetic field equal to the vector sum of the vehicle and earth magnetic field to yield vehicle heading. Once detected, magnetic transients are also used to initiate auto-calibration.

BRIEF DESCRIPTION OF THE DRAWINGS

Other objects and advantages of the invention will become apparent upon reading the following detailed description and upon reference to the drawings in which:

FIG. 2b is a continuation of the flow chart of FIG. 2a.

DETAILED DESCRIPTION OF THE PREFERRED EMBODIMENT

Figure 1:
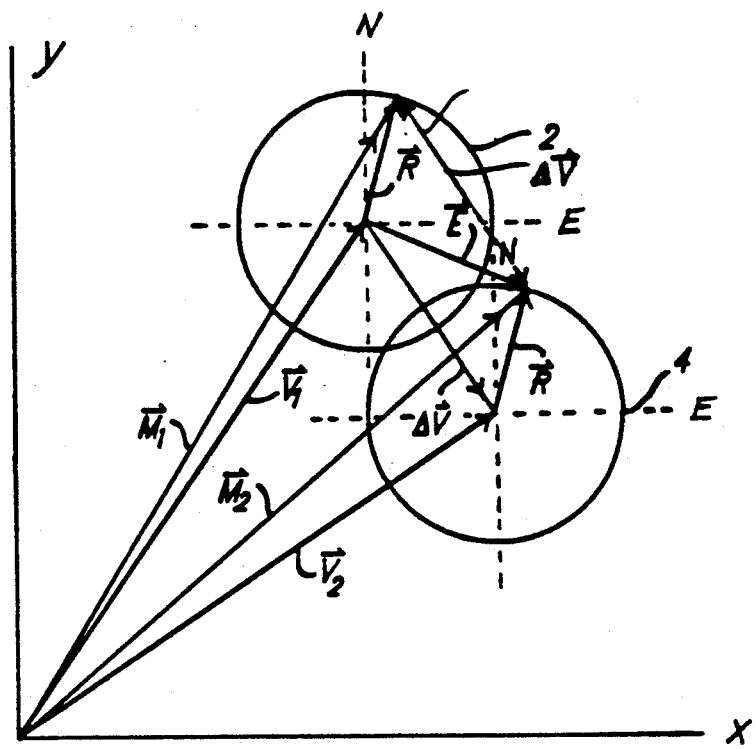
FIG. 1 contains two circles referenced to a cartesian coordinate system. The circles are generated by the vector $\bar{R}$ which represents the magnitude and direction of the earth's magnetic field as sensed by the flux-gate sensor. The vector $\bar{V}_1$ represents the steady state magnitude and direction of the vehicle's magnetic field vector, and the vector $\bar{V}_2$ represents the magnitude and direction of the vehicle's magnetic field $\bar{V}_2$ vector in the presence of magnetic offsets. The vector $\Delta \bar{V}$ represents the resultant change in the steady state vector $\bar{V}_1$.

Turning now to FIG. 1 there is shown a cartesian coordinate system. The x and y axes correspond to the two sense coils of a flux gate. The two circles 2 and 4 represent the earth's magnetic field circle which is the locus of points described by the earth's magnetic field vector $\bar{R}$ as the vehicle changes heading. The steady state magnetic field of the vehicle is represented by the vector $\bar{V}_1$. The transient magnetic field of the vehicle is represented by the vector $\Delta \bar{V}$, which represents the combined transient magnetic distortions caused by, for example, a radiator fan motor turning on, or turn signals being used, or a rear defogger switched on, and can be expressed as the difference between the vectors $\bar{V}_1$ and $\bar{V}_2$. $\bar{V}_2$ is the magnetic field vector of the vehicle (including the steady state plus the transient). The magnetic fields as sensed by the flux gate sensor are represented as $\bar{M}_1$ in the steady state case and $\bar{M}_2$ in the transient plus steady state case. FIG. 1 illustrates how the vehicle's magnetic field can change in the presence of magnetic transients.

An electronic compass which is incapable of recognizing when a magnetic offset has occurred generates erroneous heading information. Suppose that a magnetic transient has occurred and the total vehicle's magnetic field plus the transient is represented by the vector $\bar{V}_2$, the magnetic field sensed by the flux-gate sensor is then the vector $\bar{M}_2$. Since the electronic compass knows only the steady state value for the vehicle's magnetic field, since this is the compass calibration value, it erroneously subtracts the vector $\bar{V}_1$ from the vector $\bar{M}_2$ to obtain an earth's magnetic field vector $\bar{E}$ having a different magnitude and direction than the actual magnetic field vector $\bar{R}$. The heading information associated with the vector $\bar{E}$ is erroneously displayed by the electronic compass system. As an example, take FIG. 1 where the magnetic field direction is shown to be about 20° East of North whereas the compass will read about 25° South of East since the compass references only the $\bar{V}_1$ vector value (only one calibration value).

Figure 2A:
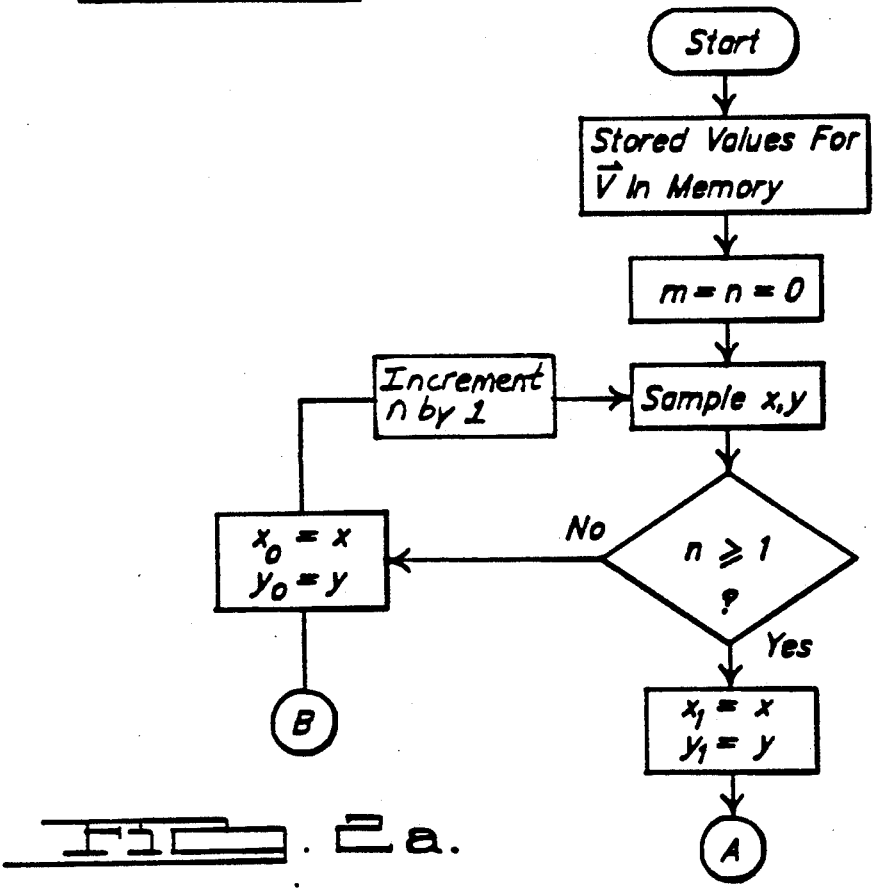
FIG. 2a is a flowchart illustrating the method of the present invention.
Figure 2B:
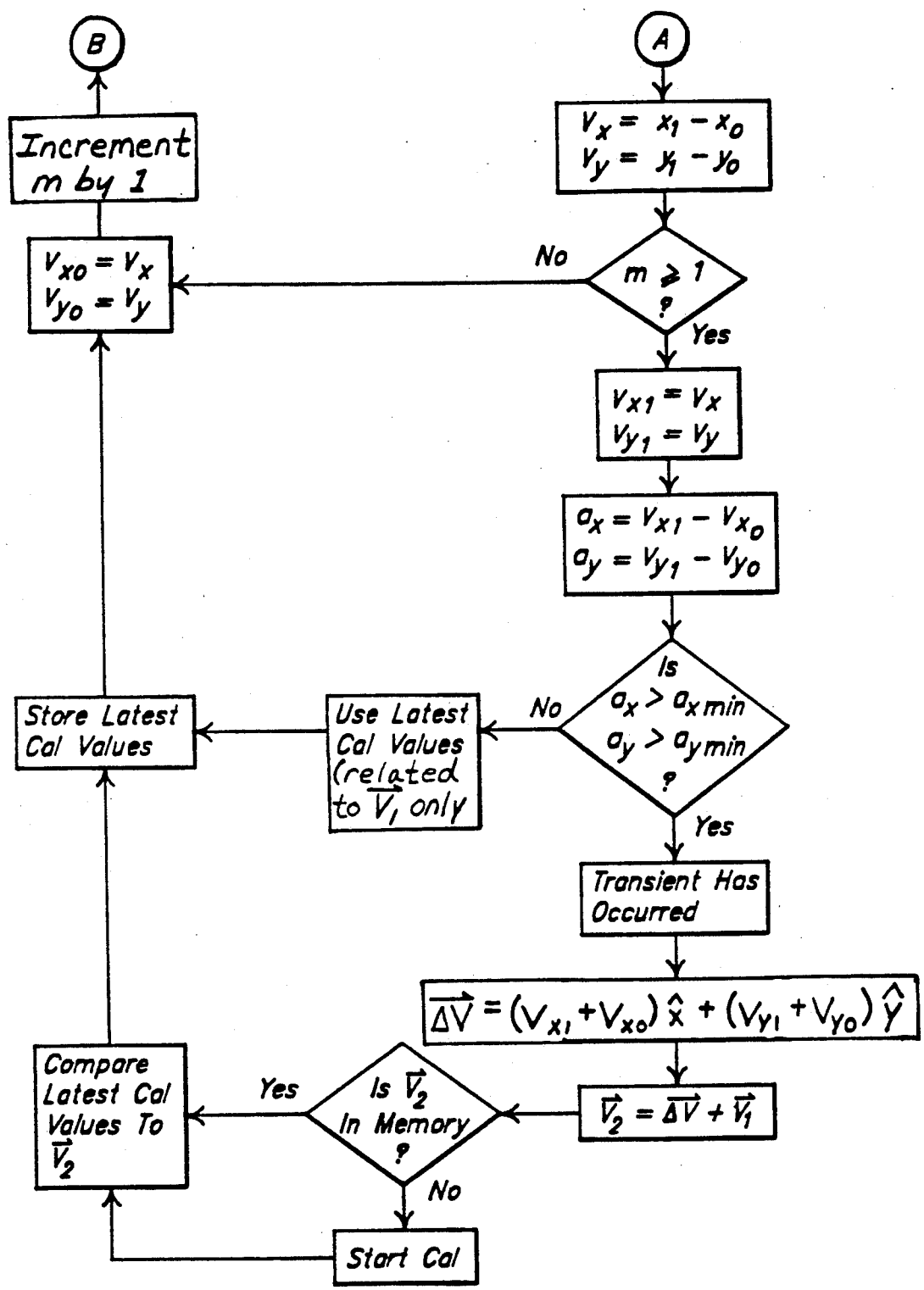

Turning now to FIGS. 2a and 2b there is shown a flowchart illustrating the method of the present invention. The first step is to take two sample readings of x and y coordinates for a given heading. The velocity or change since the last sample, caused by switching electrical equipment on or off, is then calculated for the x and y values:

$$v_{xo} = x_1 - x_o$$

$$v_{yo} = y_1 - y_o$$

where $x_1$ and $y_1$ are the most recently sampled values for x and y, and $x_o$ and $y_o$ are the last sampled values for x and y, and $v_{xo}$ and $v_{yo}$ are the velocities in the x and y values.

For the same heading, a third set of values $x_2$ and $y_2$ are sampled and used to calculate a second set of velocities:

$$v_{x1} = x_2 - x_1$$

$$v_{y1} = y_2 - y_1$$

where $v_{x1}$ and $v_{y1}$ are the second set of velocities in the x and y values. Accelerations are then determined by comparing the first set of velocities with the second set of velocities:

$$a_x = v_{x1} - v_{xo}$$

$$a_y = v_{y1} - v_{yo}$$

These accelerations are then compared with previously measured and categorized threshold values representing the minimum accelerations caused by the switching of electrical equipment stored within the memory of the microcomputer so as to distinguish magnetic transients caused by switching electrical equipment on and off from other magnetic transients.

The method described above to determine a change in vehicle magnetic field can also be used as a trigger to compensate the magnetic readings for the offset. The first time a transient occurs, the value M1 from before the transient is stored, and is subtracted from the value of M2 which is taken after the transient is over and the steady-state offset has been reached. It is assumed that nothing else is changing the magnetic field during this time.

This vector $\Delta \bar{V}$ is compared to previously stored data on the magnitude and direction of $\Delta \bar{V}$ and is used to appropriately update the stored value.

During further operation, $\Delta \bar{V}$ is subtracted from the current value of M for both calibration and display purposes. When the opposite transient occurs, the compass system ceases subtracting $\Delta \bar{V}$ from M and the compass resumes normal operation.

Figure 3:
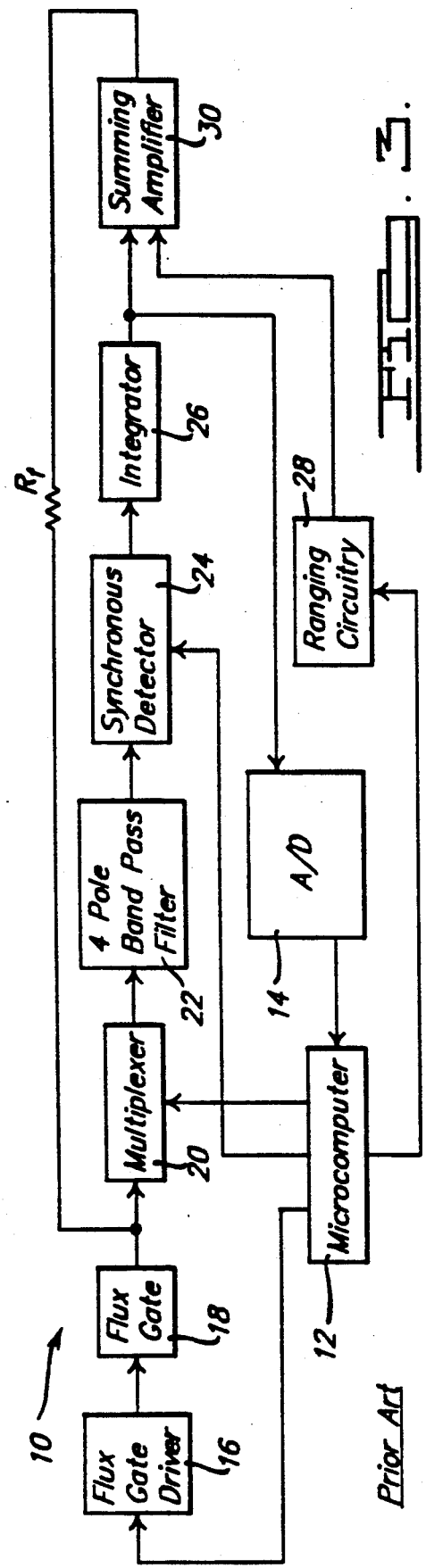
FIG. 3 is a block diagram of the electronic compass disclosed in the '843 patent to Hormel.

Turning now to FIG. 3 there is shown a block diagram of the electronic compass control circuit 10 disclosed in the '843 patent to Hormel. The heart of the system is the microcomputer 12 which employs an 8-bit analog-to-digital converter 14. The microcomputer 12 controls operation of the electronic compass system beginning with the flux-gate driver 16. Upon receipt of a square wave signal from the microcomputer 12 the flux-gate driver 16 adds enough drive to the signal to saturate the flux-gate 18. The operation of the flux-gate driver 16 and flux-gate 18 are explained in the documents incorporated by reference; namely "A Magnetic Heading Reference for the Electro/Fluidic Autopilot" and "Magnetic Field Sensor and Its Application to Automobiles," SAE Paper No. 800123. The flux-gate 18 employs two sense coils oriented perpendicularly to one another. Voltages are induced across the sense coils by the presence of the magnetic fields of the vehicle and the earth.

The voltages from the sense coils of the flux gate are processed by the multiplexer 20. The multiplexer 20 is in communication with the microcomputer 12 which generates a signal for controlling a network for switching use of the 4-pole bandpass filter 22, the synchronous detector 24 and the integrator 26 periodically from one sense coil to the other. The multiplexer 20 is in communication with the 4-pole bandpass filter 22 which filters out all but the second harmonic signals whose amplitude is proportional to the earth's magnetic field.

Second harmonic signals are presented to the synchronous detector 24. The function of the synchronous detector 24 is to select the portion of the filtered signals to be integrated by the integrator 26. The output of the synchronous detector 24 is a half-wave rectified signal which is fed into the integrator 26.

The output of the integrator 26 periodically switches back and forth between two direct current (DC) levels corresponding to the two sense coils of the flux-gate 18. Integrator output is stabilized by feeding back a current through resistor $R_f$ to the sense coils of the flux-gate 18. The feedback current eventually becomes an equal and opposite signal verses that produced by the magnetic field sensed by the flux-gate 18. The summing amplifier 28 combines integrator output with the output of a ranging circuit 30. The purpose of the ranging circuit 30 is to reduce the voltage across the flux-gate 18 to within the input voltage range of the multiplexer 20.

Heading information is determined from the output of the integrator 26. The microcomputer 12 is coupled to the integrator output through the 8-bit analog-to-digital converter 14. The 8-bit analog-to-digital converter converts the DC levels to digital coordinates referenced to a cartesian coordinate system. The microcomputer 12 divides the y coordinate corresponding to the DC level from one coil by the x coordinate corresponding to the other coil and takes the arctangent of the quotient using a piece-wise-linear-function-of-x routine to yield the vehicle's heading.

One requirement for an electronic compass system employing the method of the present invention is the system must have sufficient memory and processing power to recognize the pattern of the switching transient even if buried in noise.

Figure 4:
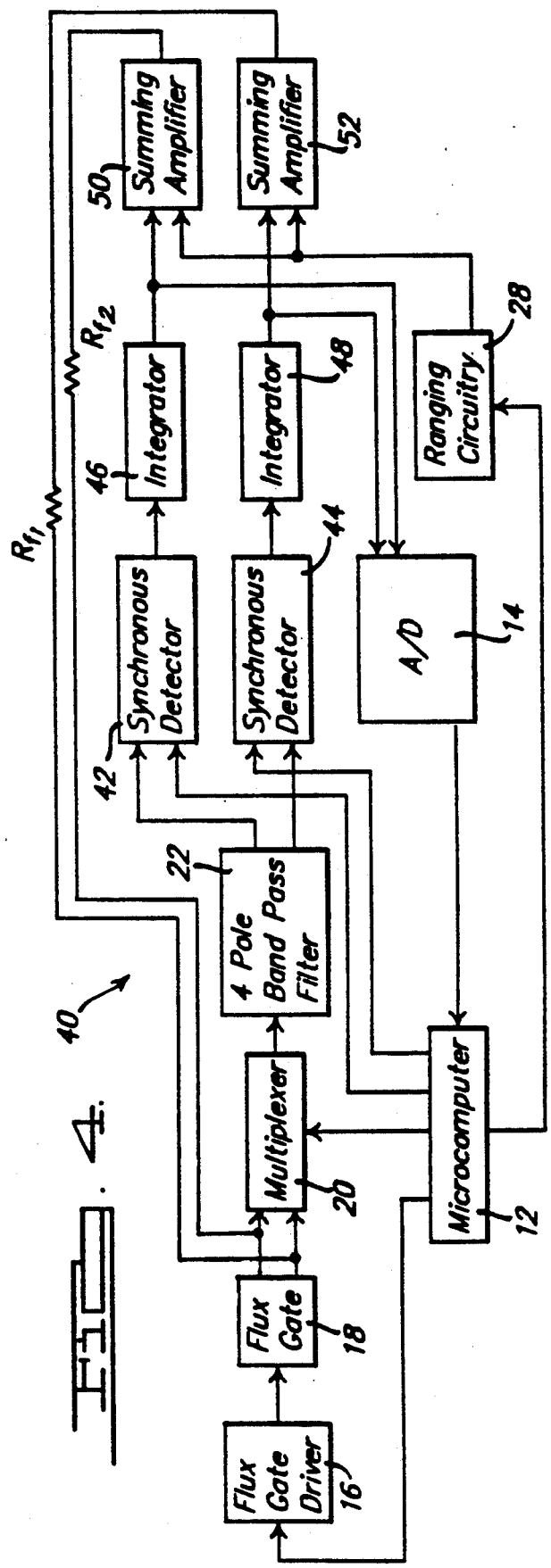
FIG. 4 is a block diagram of the compass system of the present invention.

A second requirement for the detection of transients under the method of the present invention is a high sample rate. The method requires that the change in signal between samples from normal motions be small. If the interval between samples is large, the motion of the vehicle can produce changes from sample to sample which are as large as the transients. This makes the transients indistinguishable from the signal and defeats the method. As shown in FIG. 4, the electronic compass control circuit 40 of the present invention uses both multiplexing and non-multiplexing schemes. Similar to the electronic compass control circuit 10 in the '843 patent to Hormel, the two channels are multiplexed by a pair of analog switches and they are fed into one common 4-pole bandpass filter 22 to minimize cost. However, two bandpass filters without a multiplexer could also be used. The compass control circuit 40 of the present invention uses two separate synchronous detectors 42 and 44, each one cascaded to its own integrator 46 and 48. Therefore, the compass control circuit 40 has two separate outputs, one for the x channel reading and the other for the y channel reading. Two summing amplifiers 50 and 52 are required to combine integrator outputs with the output of the ranging circuit 28.

The compass control circuit 40 of the present invention has a higher sampling rate than the compass control circuit 10 in the '843 patent to Hormel. In the case of a single synchronous detector-integrator circuit of Hormel, the integrator 26 maintains a certain voltage level at the output for one channel, and when the second channel is switched the integrator 26 must charge or discharge to achieve and maintain the new output voltage level that corresponds to the second channel. The same thing happens when this channel switches back to the first one. The charging and discharging process requires time in order to achieve a final stabilized output voltage level. This charging time limits the multiplexing rate at which Hormel's '843 can operate. However, the compass control circuit 40 of the present invention can speed up the multiplexing rate because each of the two integrators 46 and 48 can be held at its output voltage level while the other integrator is being updated. Absent the occurrence of a transient, the updated reading would not differ much from the previous reading since the sampling rate or multiplexing rate is relatively fast.

Armed with the foregoing detailed description of the sequence of operations carried out by the preferred embodiment of the present invention, those of ordinary skill in the art will readily be able to write their own suitable software to operate a microcomputer-based electronic compass system in accordance with the teachings herein. Accordingly, the details of such software need not be described here. The software may be written in any suitable language, such as a lower-level language like assembly language, or a higher-level language such as "C". Similarly, virtually all of the digital aspects of the control circuitry for an electronic compass system of the present invention may be implemented with any suitable general-purpose microcomputer with off-chip or on-chip A/D capability, or may be implemented in an application-specific integrated circuit custom-designed for handling the required processing activities. Armed with the teachings of the present invention disclosed herein, those of ordinary skill in the art are well-equipped to implement the present invention in any suitable combination of the digital and/or analog circuits. Accordingly, further details of such hardware need not be described here.

What is claimed is:

1. In an electronic compass system for a vehicle operating within a resultant magnetic field made up of the earth's and vehicle's magnetic field wherein said vehicle's magnetic field periodically includes electrical transients, a technique for calculating heating comprising:
    (a) orienting first and second sense coils of a flux-gate sensor perpendicular to each other in the earth's magnetic field;
    (b) saturating said sense coils with a drive signal;
    (c) measuring an induced voltage in said sense coils induced by said resultant magnetic field;
    (d) sensing, calculating and storing in a memory unit of a processing unit a first heading data value related to said induced voltage for a resultant magnetic field for a given vehicle heating;
    (e) sensing, calculating and storing a second heading data value related to said induced voltage for the resultant magnetic field for said given vehicle heating;

(f) calculating and storing a first heading data velocity by subtracting said first stored data value from said second stored data value;

(g) sensing and storing a third heading data value related to said induced voltage for the resultant magnetic field for said given vehicle heading;

(h) calculating and storing a second heading data velocity by subtracting said second stored data value from said third stored data value;

(i) calculating and storing a heading data acceleration by subtracting said first stored data velocity from said second stored data velocity; and (j) comparing said heading data acceleration with a predetermined data acceleration representing the minimum acceleration caused by electrical transients;

(k) calculating and storing a vehicle magnetic field vector;

(l) calculating and storing a vector change in said vehicle magnetic field vector when the heading data acceleration exceeds said predetermined heading data acceleration;

(m) calculating a new vehicle magnetic field vector by adding said stored vector change to said stored vehicle magnetic field vector;

(n) recalling calibration values associated with said stored vehicle magnetic field vector when said new vehicle magnetic field vector corresponds to said stored vehicle magnetic field vector;

(o) adding said calibration values to said new vehicle magnetic field vector; and (p) making said new vehicle magnetic field vector available for communicating heading information to a vehicle user.

2. The method as recited in claim 1 further comprising:

(o). initiating a calibration sequence when said new vehicle magnetic field vector does not correspond to said stored vehicle magnetic field vector to determine calibration values corresponding to said new vehicle magnetic field vector; and (p) storing said new vehicle magnetic field vector and said corresponding calibration values.

3. An electronic compass control circuit comprising:

(a) a flux-gate having two sense coils and a primary coil;

(b) a flux-gate drive coupled to said primary coil for periodically saturating the flux-gate;

(c) a multiplexer having at least first and second inputs coupled independently to said two sense coils of the flux-gate;

(d) a bandpass filter coupled to said multiplexer;

(e) a first synchronous detector coupled to said bandpass filter for detecting a first filtered signal from one sensed coil of said flux-gate;

(f) a second synchronous detector coupled to said bandpass filter for detecting a second filtered signal from the other sense coil of said flux-gate;

(g) a first integrator coupled to said first synchronous detector for producing a first direct voltage containing heading information;

(h) a second integrator coupled to said second synchronous detector for producing a second direct voltage output containing heading information;

(i) an analog-to-digital converter coupled to the output of said first and second integrators for converting said first and second direct voltage outputs into digital codes; and (j) a microcomputer coupled to said analog-to-digital converter for controlling said flux-gate driver, said multiplexer, and said synchronous detector, and for determining compass headings as a function of said digital codes, the rate of change of said digital codes and the rate of change of the rate of change of said digital codes;

said first direct voltage output remaining constant while said second integrator is producing said second direct voltage output and said second direct voltage output remaining constant while said first integrator is producing said first direct voltage output.

4. The electronic compass control circuit of claim 3 further comprising:

(k) a ranging circuit controlled by said microcomputer for controlling the voltage across said sense coils;

(l) a first summing amplifier for combining the output of said first integrator with the output of said ranging circuit;

(m) a first feedback resistor for providing negative feedback from an output of said first summing amplifier to said first input of said multiplexer;

(n) a second summing amplifier for combining the output of said second integrator with the output of said ranging circuit; and (o) a second feedback resistor for providing negative feedback from said second summing amplifier to said second input of said multiplexer.

5. The electronic compass control circuit of claim 4, characterized by said first and second synchronous detectors and said first and second integrators producing a higher sampling rate than a circuit having only one synchronous detector and integrator.

* * * * *